Dec. 2, 1958 K. H. F. LUNDBERG 2,862,685
FLOW CONTROL VALVES
Filed June 11, 1951 2 Sheets-Sheet 1
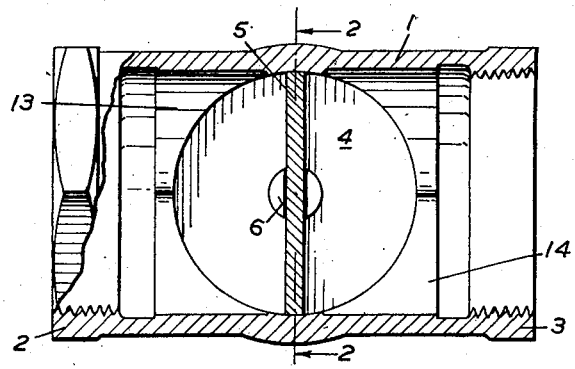
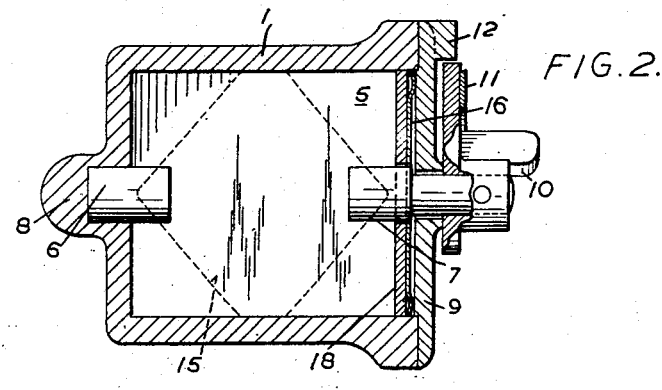
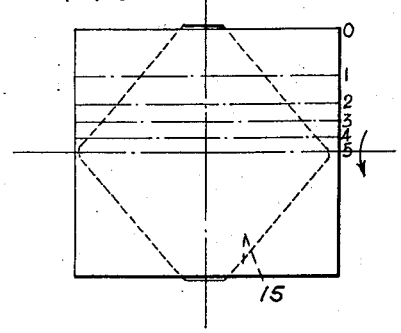
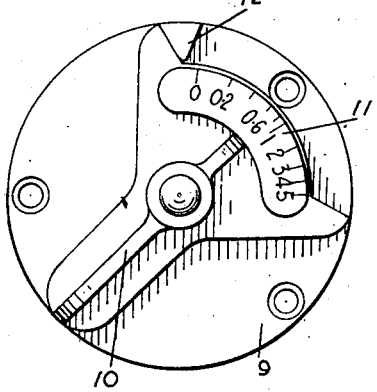
K. N. F. Lundberg, *Inventor*
By
Henderath, Lind + Ponack, *Attorneys*

Dec. 2, 1958  K. H. F. LUNDBERG  2,862,685
FLOW CONTROL VALVES

Filed June 11, 1951  2 Sheets-Sheet 2

Inventor
K.H-F. Lundberg

By
Thinderott, Lind & Ponack
Attorneys.

# United States Patent Office

2,862,685
Patented Dec. 2, 1958

2,862,685

FLOW CONTROL VALVES

Kurt Hugo Folke Lundberg, Upsala, Sweden, assignor to Urquhart's (1926) Limited, London, England, a British company Application June 11, 1951, Serial No. 230,885

Claims priority, application Great Britain June 30, 1950

2 Claims. (Cl. 251—305)

This invention relates to flow control valves, particularly for the control of gaseous fluids.

It is an object of the invention to produce a flow control valve of the so-called "butterfly" type in which the valve plate is securely held in fluid tight relationship in the valve body. Accordingly, the invention provides a valve body having a flow passage extending through it and a cylindrical chamber formed transversely across it. A rectangular plate valve member is disposed diametrically in the cylindrical chamber and is rockable about the axis of said chamber. The flow obstructing portions of the cylindrical wall of the cylindrical chamber are formed with ports or windows situated in the line of flow and shaped to produce a predetermined flow effect as the plate valve member is angularly adjusted. An end wall liner is positioned against one of the end walls of the cylindrical chamber, and means are provided for resiliently pressing one face of the liner against the adjacent flank edge of the plate valve member.

A further object of the invention is to provide such a valve with a specific flow control feature. To achieve this object, the valve ports are made diamond shaped.

It will be understood that a flow control valve so constructed is easy to manufacture and readily assembled and disassembled; moreover it requires no lubrication, as friction is confined to sliding contact of the edges of the plate against the cylindrical chamber walls.

In order that the invention may be clearly understood and readily carried into effect the same will now be described more fully with reference to the accompanying drawings in which:

Figure 1 is a longitudinal sectional view through one embodiment of the improved valve.

Figure 2 is a cross sectional view on the line 2—2 of Figure 1.

Figure 3 is an end elevation as seen at the right hand end of Figure 2.

Figure 4 is a diagram illustrating the opening effects of the movable valve member.

Figure 5:
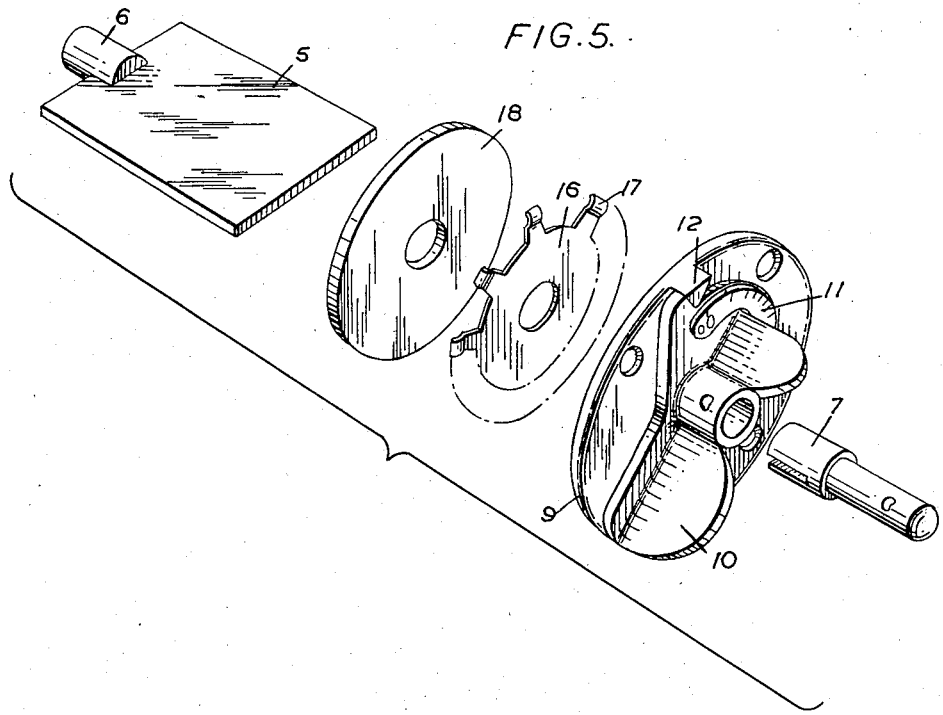
Figure 5 shows certain parts of the valve disassembled.

The valve shown comprises a body or casing 1 having internally screw-threaded tubular ends 2 and 3 for the entry and exit of the fluid to be controlled. Formed transversely across the valve body is a cylindrical chamber 4 in which is mounted a valve member 5 of rectangular plate form having trunnions 6 and 7 for enabling the plate to be rocked about the axis of the chamber. The trunnion 6 fits into a cylindrical recess in a boss 8 on the valve body and is formed with a diametrical slot to receive one edge of the plate as seen most clearly in Figures 1 and 5. The opposite edge of the plate 5 is similarly held in the trunnion 7 which is itself mounted in an end plate 9 which serves as a closure for the cylindrical chamber 4. Pinned on the trunnion 7 is a handle 10 formed also with a graduated quadrant 11 for co-operation with a pointer 12 carried on the outer face of the end plate 9 and serving also as a stop piece.

In the two walls 13, 14, between the interior of the cylindrical chamber 4 and the tubular ends of the valve body 1, ports or windows 15 of substantially diamond pattern are formed, one diagonal of each such port being parallel with the cylindrical chamber axis as clearly shown.

It will be understood that as the plate valve member 5 is moved angularly from the vertical zero position shown in Figures 1 and 2, the increasing flow areas are as indicated by the horizontal numbered lines 1, 2, 3, 4, 5, in Figure 4. In particular it will be seen that a relatively large movement of the plate valve member 5 is required to produce the area designated by the line marked 1, and that fractional parts of this area are easily obtainable without involving excessive fineness of adjustment of the plate valve member. The simplicity of construction of the valve and the ease of assembly and disassembly will be apparent from a consideration of Figure 5. Figure 5 also shows clearly a simple device for ensuring a close sliding fit between the flank edges of the plate valve member 5 and the end walls of the cylindrical chamber 4, this device consisting of a disc or washer 16 having radially disposed bent spring fingers 17 and a central aperture for seating on the trunnion 7, on which is also mounted a disc 18 serving as an end-wall liner for the cylindrical chamber.

What I claim is:

1. A flow-control valve comprising a valve body having a flow passage through it and a cylindrical chamber formed transversely across it, and a rectangular plate valve member disposed diametrically in and rockable about the axis of said chamber, the flow-obstructing portions of the cylindrical wall of said cylindrical chamber being formed with ports situated in the line of flow and shaped to produce a predetermined flow control effect as the plate valve member is angularly adjusted, in combination with an end wall liner adjacent one of the end walls of the cylindrical chamber, and means for resiliently pressing one face of said liner against the adjacent flank edge of the plate valve member.

2. A flow-control valve comprising a valve body having a flow passage through it and a cylindrical chamber formed transversely across it, and a rectangular plate valve member disposed diametrically in and rockable about the axis of said chamber, the flow-obstructing portions of the cylindrical wall of said cylindrical chamber being formed with ports situated in the line of flow and shaped to produce a predetermined flow control effect as the plate valve member is angularly adjusted, the said ports in the cylindrical wall of the cylindrical chamber being each substantially diamond in shape with one diagonal of the diamond parallel with the axis of the cylindrical chamber in combination with an end wall liner adjacent one of the end walls of the cylindrical chamber, and means for resiliently pressing one face of said liner against the adjacent flank edge of the plate valve member.

References Cited in the file of this patent

UNITED STATES PATENTS

| | | |
|---|---|---|
| 799,394 | Lynch | Sept. 12, 1905 |
| 824,585 | Rieth | June 26, 1906 |
| 1,588,315 | Dalzell | June 8, 1926 |
| 1,931,048 | Wiener | Oct. 17, 1933 |
| 2,174,547 | Bailey | Oct. 3, 1939 |
| 2,554,040 | Long | May 22, 1951 |

FOREIGN PATENTS

| | | |
|---|---|---|
| 796,613 | France | Apr. 11, 1936 |
| 597,547 | Great Britain | Jan. 28, 1948 |